UNITED STATES PATENT OFFICE.

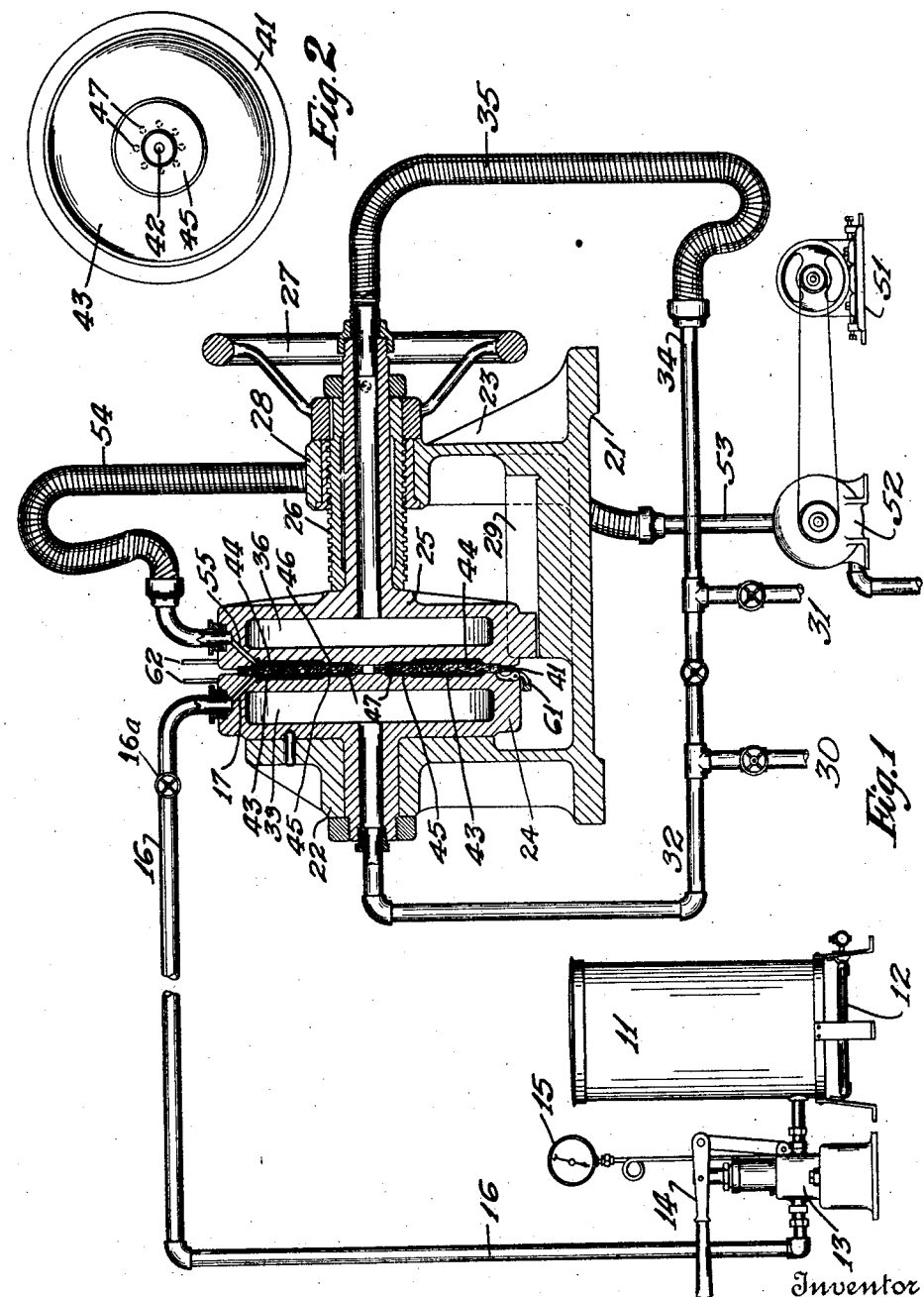

JOHN A. McVICKAR, OF NEW YORK, N. Y.

PROCESS FOR MOLDING WAX RECORDS.

1,394,034.  Specification of Letters Patent.  Patented Oct. 18, 1921.

Application filed August 20, 1920. Serial No. 404,741.

*To all whom it may concern:*

Be it known that I, JOHN A. MCVICKAR, a citizen of the United States, and a resident of 1 East 49th street, New York city, in the county of New York, and State of New York, have invented certain new and useful Improvements in Processes for Molding Wax Records, of which the following is a specification.

This invention relates to a process and apparatus for molding wax records and has for an object to produce records for phonographs of a comparatively soft medium which may be used for recording and reproducing purposes, this medium being molded upon a non-fragile base so that it may be handled without trouble from breakage.

The medium used for producing records of this kind consists of an especially prepared wax compound of a homogeneous structure, which must be applied uniformly, without hard spots, without ridges, air bubbles or shrinkage spaces. The process in the present invention includes means for applying the sensitive medium to both sides of a record by the same operation and secures these results.

This process consists in a special mold holding the non-fragile portion of the record and providing means for exhausting the air from the space where the wax is to be applied. After this space is vacuumed, the liquid wax is applied preferably under pressure and instantly fills the space in the mold provided for the wax. The wax is applied in a comparatively thin film and is made of a compound that when applied in thin layers has comparatively little shrinkage so that on cooling, the wax maintains its shape and is separated from the mold with a highly-polished, smooth surface, corresponding to the surface of the mold.

In the present form of the invention the liquid wax is applied to one side of the mold and a communicating passage is provided between this side and the opposite side whereby the wax is forced into the opposite side. This passage, however, calls for the use of a column of wax through the non-fragile member which is much thicker than the film of wax applied for recording purposes and therefore on cooling is liable to show a shrinkage where these communicating passages are placed. These passages are therefore placed near the center on a portion of the record which is not used for sound recording purposes.

The apparatus includes a means whereby the mold itself may readily be heated to a heat corresponding to the liquid wax so that a uniform flow of wax throughout the mold is assured. This same part of the mechanism may be changed over for cooling the mold after the wax has been poured, by the use of cold water. A general arrangement of this process will be understood from the accompanying specification and drawings in which Figure 1 shows a hand operated mold in section together with the necessary connections for carrying on this process and Fig. 2 shows the finished record.

The mold is supported on a stand 21 having bearing arms 22 and 23 as shown. The arm 22 supports the half section of the mold 24 which is rigidly secured throughout and the arm 23 secures the corresponding opposite section 25 which is movable by means of the screw 26 operated by handle 27 in the threaded bearing 28; turning hand wheel 27 therefore moves the half section of the mold 25 back and forth on the slide 29 and enables it to be brought with great pressure against the section 24. 41 represents a non-fragile supporting member for the record which may be made of a material similar to jute board which is comparatively non-fibrous and therefore not likely to warp. This board is placed in a receptacle between the sections 24 and 25 of the mold and when these sections are tightly brought together, an air-tight connection is made between them in which this board acts as a gasket. This board is provided with a hole 42, Fig. 2, for the stem of the phonograph turntable. On the section surrounding this hole no wax is applied. The sensitive medium or wax upon which the sound waves are recorded, indicated by 43 on one side and 44 on the opposite side of the jute board, is molded in comparatively thin, flat rings with beveled edges. The interior of this ring is continued by a thinner section of wax indicated by 45 on one side and 46 on the opposite side which covers the holes indicated at 47, passing through the jute board and connects the wax on both sides of the record, thus molding both sides at the same time.

The liquid wax is contained in the tank 11 which is heated by the gas heater 12 and by means of the pressure pump 13 operated by the lever 14 the wax is delivered through the pipe 16 at a pressure shown by gage 15 which leads to the spaces 43 and 45 forming one side of the record and through openings 47 leads to spaces 44 and 46 forming the other side of the record. Before the wax is applied the vacuum pump 52 is operated by the motor 51 and by means of pipe 53 and flexible pipe 54 exhausts the spaces 43, 44, 45 and 46 through the opening 55, in this way guarding against the possibility of air bubbles appearing in the molded record which would be fatal to its use.

The side 24 of the mold has a chamber 33 communicating with pipe 32 and by suitable valves with pipe 30. Also the opposite head has a chamber 36 communicating with the flexible pipe 35 and pipe 34 through suitable valves with pipe 31. These pipes 30 and 31 may be connected with a steam supply which will raise the temperature of the engaging surface of the mold corresponding with that of the liquid wax. By this means and by forcing the wax under pressure into the vacuum mold, it fills the space with great rapidity, producing a homogeneous molded product. Also the contraction of the mold on cooling follows the contraction of the compound. Chambers 33 and 36 may be provided with drainage outlets which, however, are not shown on the drawings.

When the record has been molded it is desirable that the mold be cooled as rapidly as possible to save time in its use. For this purpose the pipes 30 and 31 may be connected to a cold air supply or a cold water supply cooling chambers 33 and 36 and enabling the molded record to be quickly released from the mold.

The beveled edges of the molded wax enable the record to be removed without undue effort from the mold heads when the head 25 is withdrawn from the head 24. However, a lever and ring arrangement 61 may be provided to facilitate this movement. Also the levers 62 may be used to cut the gate of the wax in openings 17 and 55 by a means not shown in the drawings. It is desirable that the pipe 16 be made as short as possible.

The construction indicates the use of a hand-operated mold. However, for production purposes, power-operated molds operating in multiple units would be substituted for the hand mechanism here shown. Attention is called to the fact that the wax, being applied under pressure to the jute board which has been exhausted by a vacuum process, enters the pores of the board and forms a bond between the two, thus holding the wax on its supporting medium.

Attention is called to the fact that while the use of a combined vacuum and pressure process has been described as the preferred embodiment of the present invention, the vacuum process may be used alone to force the liquid compound into the mold by the suction of the vacuum without the use of the pressure pump. Good results may be obtained in this way, when the compound is reduced to the proper consistency.

Having thus described my invention, I claim:

1. A process for molding blank wax records consisting of rapidly forcing wax compound which has been reduced to a liquid state by the application of heat, into a suitable mold which has previously been vacuumed.

2. A process for molding blank wax records consisting of rapidly forcing wax compound which has been reduced to a liquid state by the application of heat, into a mold which has been previously vacuumed and heated to approximately the same temperature as the compound and then applying a cooling medium to the mold.

3. A process for molding blank wax records on a non-fragile, porous supporting disk by placing said disk in a mold and forcing liquid wax compound into this mold which has been previously vacuumed.

4. A process for molding blank wax records on both sides of a non-fragile supporting disk by placing said disk in a mold, vacuuming said mold, and forcing liquid wax compound into this mold on both sides of said disk.

5. A process for molding blank wax records on both sides of a non-fragile supporting disk with an active and an inactive surface by placing said disk in a mold and providing a communicating space between each side of said mold opposite the inactive surface and forcing liquid wax compound into said mold.

6. A process for molding blank wax records on both sides of a non-fragile supporting disk by placing said disk in a mold, vacuuming said mold and admitting liquid wax compound to said mold.

Signed at New York city, in the county of New York and State of New York, this twelfth day of June, A. D. 1920.

JOHN A. McVICKAR.